United States Patent [19]
Taisne

[11] 3,733,472
[45] May 15, 1973

[54] APPARATUS FOR THE AUTOMATIC DETECTION OF COUNTING ERRORS IN A DISPLACEMENT MEASURING SYSTEM BY ENCODING AND COUNTING

[75] Inventor: Jean Taisne, Fontenay sous Bois, France

[73] Assignee: Societe D'Optique Precision, Electronique Et Mecanique Sopelem, Paris, France

[22] Filed: Jan. 28, 1972

[21] Appl. No.: 221,710

[52] U.S. Cl. ............235/92 DN, 235/92 EC, 235/92, 235/92 CA, 235/92 CM, 235/153, 235/92 EA
[51] Int. Cl. ............................................H03k 21/30
[58] Field of Search......................235/92 CA, 92 GC, 235/92 DN, 92 V, 92 LG, 92 CM, 92 EC, 153; 340/282

[56] References Cited

UNITED STATES PATENTS 3,638,186   1/1972   Schwefel..........................235/92 EC Primary Examiner—Thomas A. Robinson
Assistant Examiner—Joseph M. Thesz, Jr.
Attorney—William B. Kerkam Jr.

[57] ABSTRACT

Counting errors are automatically detected in a displacement measuring system using encoding and counting by sensing a value $C_L$ and substracting it from a value $C_E$ registered by a counter. The difference of the values is memorized at the beginning of measurement and is then continuously compared with the memorized difference. Non-coincidence between the instantaneous difference and the memorized difference actuates an alarm.

9 Claims, 5 Drawing Figures

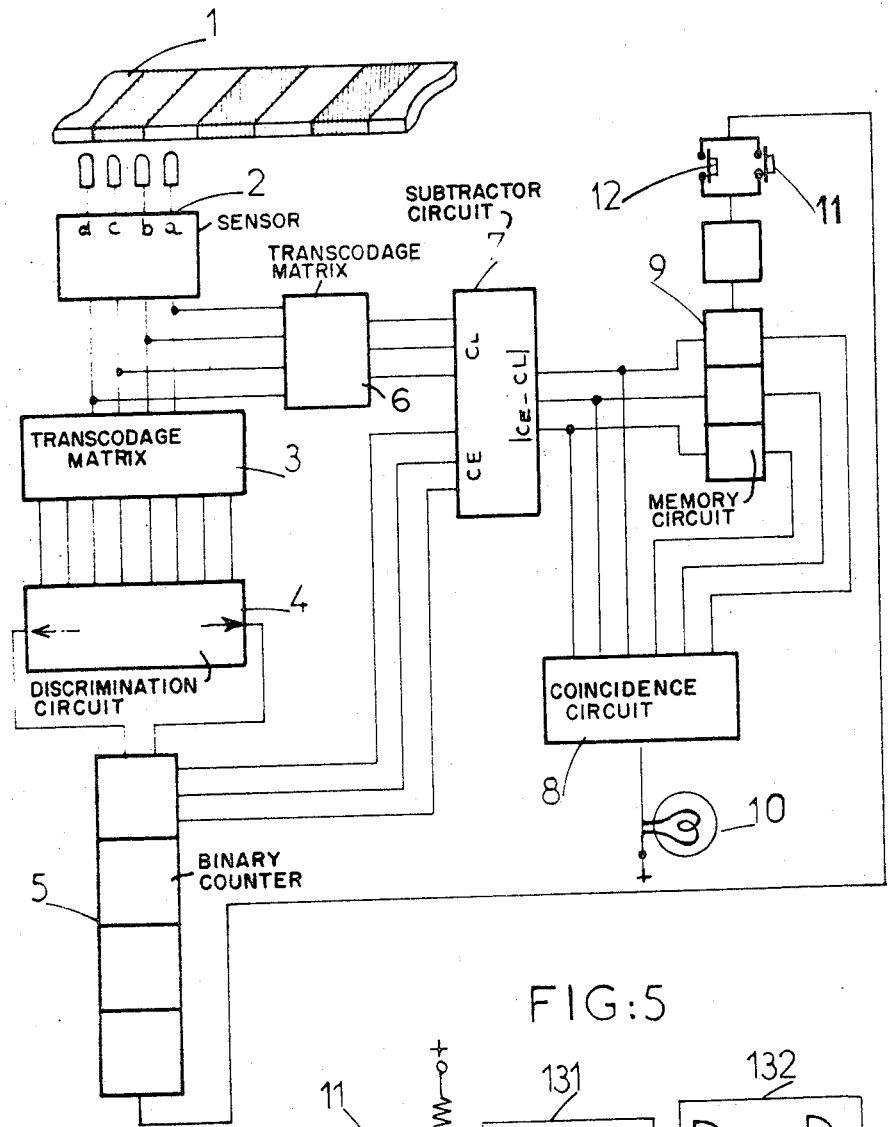
FIG:1
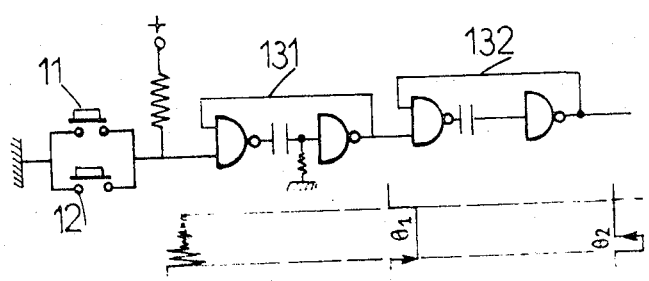
FIG:5

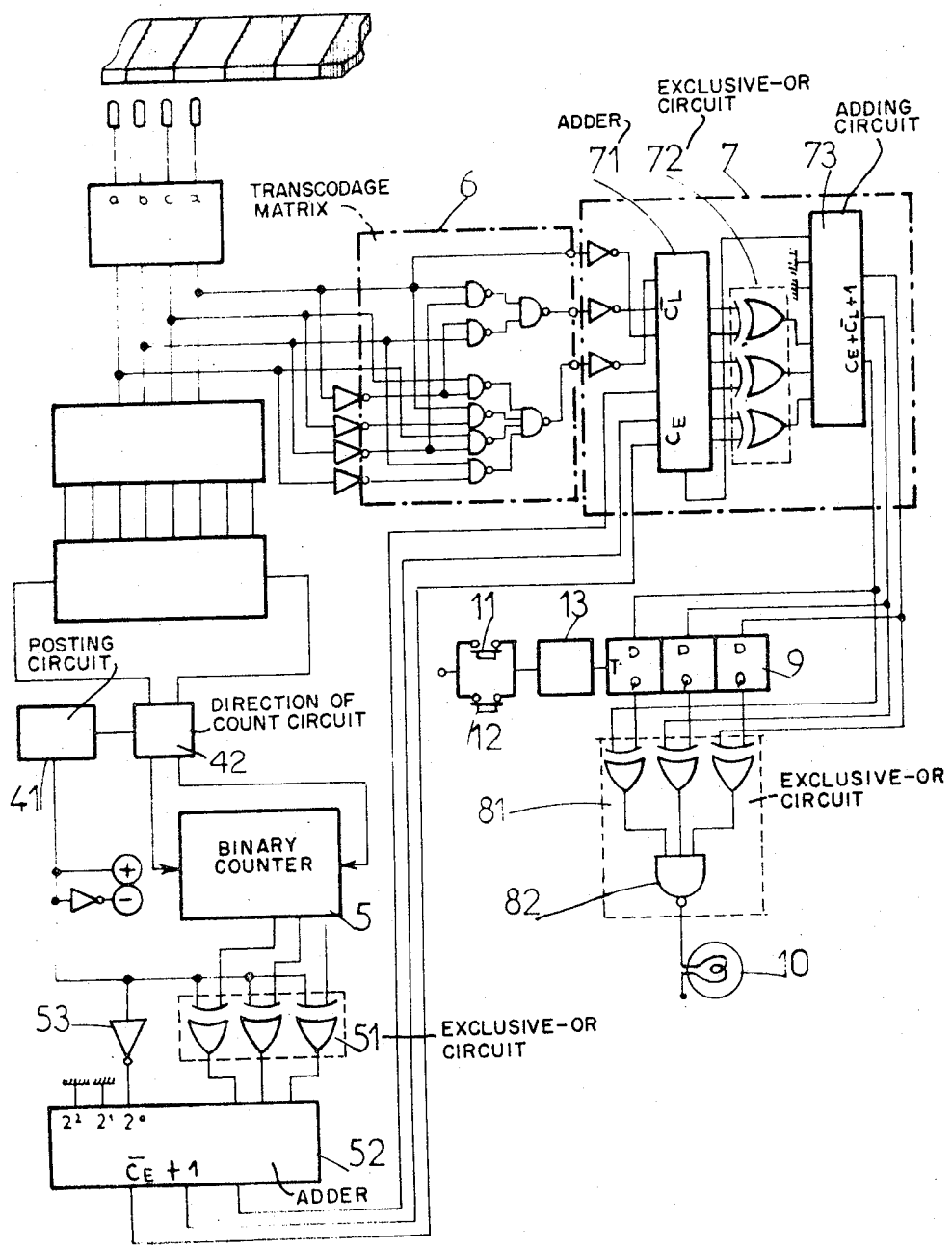
FIG:2

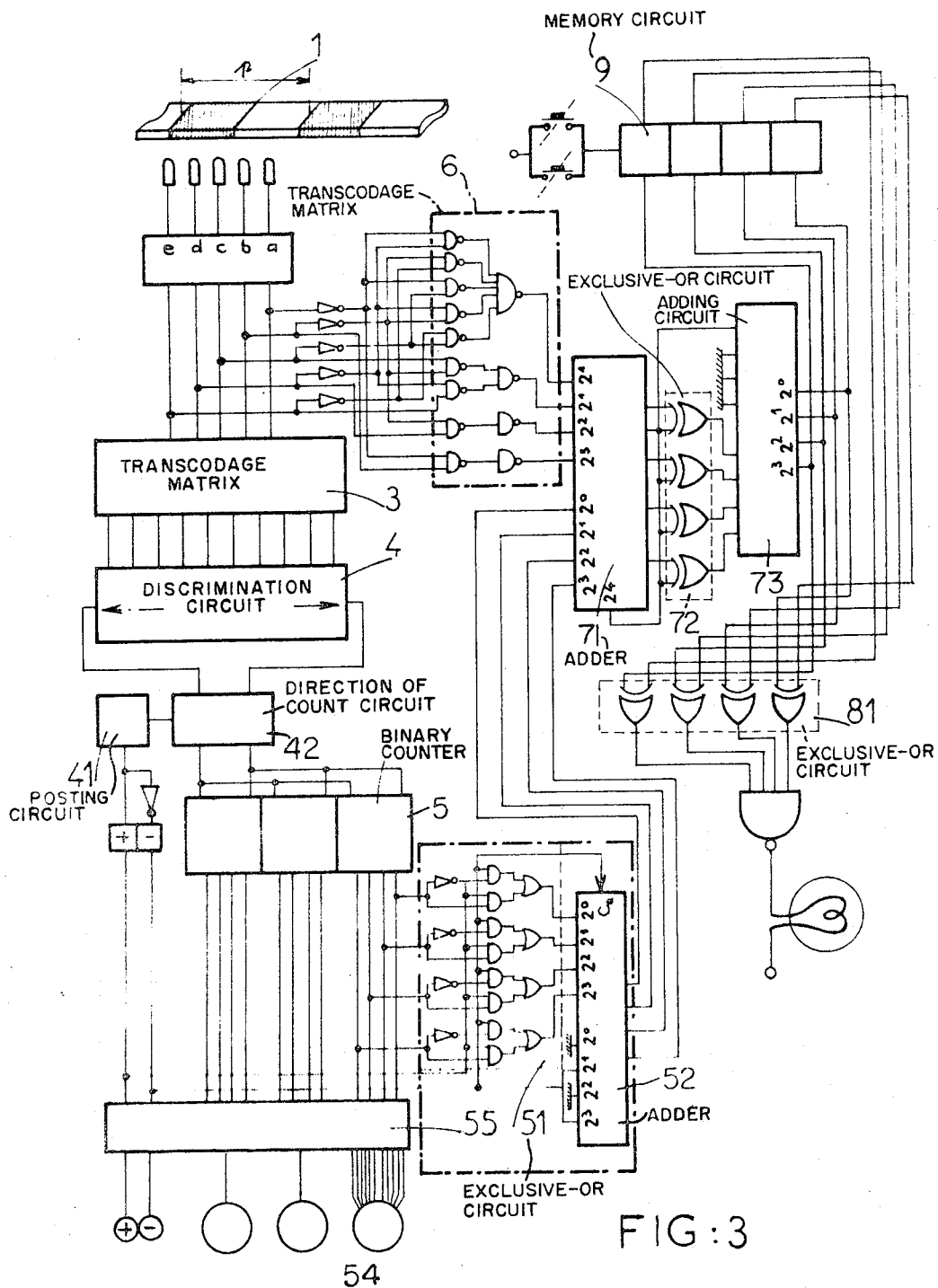
FIG:3

APPARATUS FOR THE AUTOMATIC DETECTION OF COUNTING ERRORS IN A DISPLACEMENT MEASURING SYSTEM BY ENCODING AND COUNTING

BACKGROUND OF THE INVENTION

The present invention relates to apparatus for the automatic detection of counting errors in a displacement measuring system using encoding and counting.

It is known that such systems, which are employed for example in the numeric control of machine tools, comprise a measuring scale, for example, in the form of a graduated track. Before the scale is located sensors or scanning devices comprising a sensor including at least an analyzer which produces, on displacement before the scale, a signal which is revised in form by known apparatus to give a control signal. Such a system is described, for example, in the application for patent filed in the U.S. on July 8, 1971, Ser. No. 160,731 by Jean Taisne and entitled "Apparatus for Measuring or Indicating Movement By Combined Encoding and Counting" which application is owned by the assignee herein. In that application, FIG. 2, reference numeral 21 shows suitable apparatus for revision of the form of the signal.

It is further known that, if the sensor includes an analyzer, the combination of $n$ signals emitted at the output of the scanning device gives an indication on the position of the sensor with respect to the scale that is, the value $C_L$ read by the scanning device in a control code with $n$ positions thus distinguishing $2n$ increments within a step of the scale.

The displacement measuring systems comprise, on the other hand, a generation network, beginning with the scanning signals, of impulses each corresponding to a displacement of an increment of the sensor with respect to the scale. These impulses are totalled in a numeric counter preceded by a circuit for the determination of the direction or sense of counting in view of the direction of displacement of the sensor and the zero position of the scale. Such apparatus is disclosed in the U.S. application for patent, Ser. No. 160,731, above referred to.

It is known that the numeric counter is composed of a series of binary bridges arranged in cascade and having output terminals furnishing in a binary code to the value $C_E$ registered by the counter, each output terminal corresponding to a bit. In accordance with the type of counter and its utilization, the registered value can be furnished with a pure binary code in which the weight of each bit corresponds to the rank of the output terminal, this value being utilized directly by a calculator, or better, in the decimal counters in a decimal number shown on an indicator, the bridges being grouped in fours in decade, each having four outputs branched on an indicator having 10 positions through an adaptor and furnishing a value in a binary coded decimal code (DCB).

The impulse generation network can comprise, for example, a transcodage circuit transforming the sensor code to $n$ positions in a 1 in $2n$ code, followed by a network for the determination of the direction of displacement which produces an impulse in one direction or the other for each change in the code.

It is seen that such a system does not give the value $C_L$ actually read by the sensors but the value $C_E$ registered by the counter, the position of the sensor being thus represented by the totalled number of impulses on the counter. It is therefore necessary to remove the parasitic disturbances which could cause registering in the counter of impulses which do not correspond to displacements of the sensor.

A number of systems to eliminate the parasites have already been proposed. Parasites have already been eliminated by producing at the input of the transcoder, for example, by the use of reflected codes. However, the most important parasites are produced at the input of the counters and it is very difficult to eliminate them. For this reason it is important to be able to detect the errors, that is, the registering by the counter of supplementary impulses corresponding not to an actual displacement of the sensor but to the entry in the counter of parasites which cannot be eliminated.

However, since the counters usually used are synchronous, it has been found that the errors introduced are practically only by the decade of lighter weights, the other decades being open only during short instants.

It is generally sufficient, to eliminate counting errors, to detect the registering of parasitic impulses in the decade of lighter weight. It is useful that the operator be advised as soon as the registry of a parasitic impulse is detected.

The invention therefore has as an object apparatus for automatic detection of counting errors comprising an alarm system notifying the operator as soon as a parasitic impulse is counted or removed by error.

If a control code having five positions and a decimal counter is used, the value $C_L$ given by the sensor and indicating the position of the sensor within a step of the scale, varies in the same way as the values of the units of the value $C_E$ registered by the counter and displayed on its indicator since the value $C_E$ varies by a unit more or less at each displacement of an increment of the sensor in one direction or the other.

If a difference exists, at the time or origin of the measurements between the value $C_L$ and the value of the units of the registered value $C_E$, this difference should remain constant wherever the movements of the sensor, and a variation of this difference will indicate the registering by the counter of parasitic impulses.

SUMMARY OF THE INVENTION

The present invention therefore has as an object apparatus for comparing permanently the value $C_L$ with the value of the units of the registered value $C_E$, or in the case of a non-decimal counter, if the values of the lesser weight of the registered value giving a value of the same form as the value $C_L$. In accordance with the invention, the apparatus comprises a subtractor circuit of the value $C_L$ and the registered value $C_E$, a memory circuit for the difference $C_E - C_L$ at an instant selected as the origin of the sensings, a coincidence circuit between the instantaneous difference $C_E - C_L$ and the memorized difference and alarm apparatus actuated by the coincidence circuit in the case of non-coincidence.

In accordance with a supplementary characteristic of the present invention, the registered value $C_E$ from which is subtracted the value $C_L$ is the signal formed on the first $p$ outputs of the counter, $p$ being an entity such that $2^{p-1} \geq n$ In the case of a displacement measuring system such that the sensor code and the output code of the counter are compatible, the sensors are characterized by the fact that the registered value $C_E$ and the value $C_L$ are applied directly to the inputs of the subtracting circuit.

On the other hand, in the case where the displacement measuring system is such that the sensor code and the code at the output of the counter are not compatible, the arrangement is characterized by the fact that the registered value $C_E$ and the value $C_L$ are applied to the inputs of the counter, one directly and the other through a transcodage circuit transforming that value into a code compatible with that of the other value.

Lastly, in the case where the displacement measuring system has a floating zero and a circuit for indicating the sign of the registered value, the apparatus is characterized by the fact that the registered value $C_E$ is applied to the input of the subtractor circuit through a complementation circuit for the value $C_E$ to the base of the code of the output of the counter, this circuit being actuated by the change of sign.

BRIEF DESCRIPTION OF THE ACCOMPANYING DRAWINGS

The present invention will now be described with reference to several preferred embodiments thereof as shown in the accompanying drawings, in which like reference characters indicate like parts. In these drawings, FIG. 1 illustrates schematically an embodiment of the present invention for the detection of errors as applied to a displacement measuring system not having a floating zero and including a number of pairs of analyzers;

FIG. 2 is a schematic showing of an embodiment of the invention in a system analogous to that of FIG. 1 having a floating zero;

FIG. 3 is a schematic showing of detection apparatus in accordance with the present invention in a displacement measuring system with a floating zero using a code having five positions and a decimal counter;

FIG. 5 shows an adaptor utilized in an embodiment of the present invention.

DESCRIPTION OF THE PREFERRED EMBODIMENTS

Figure 4:
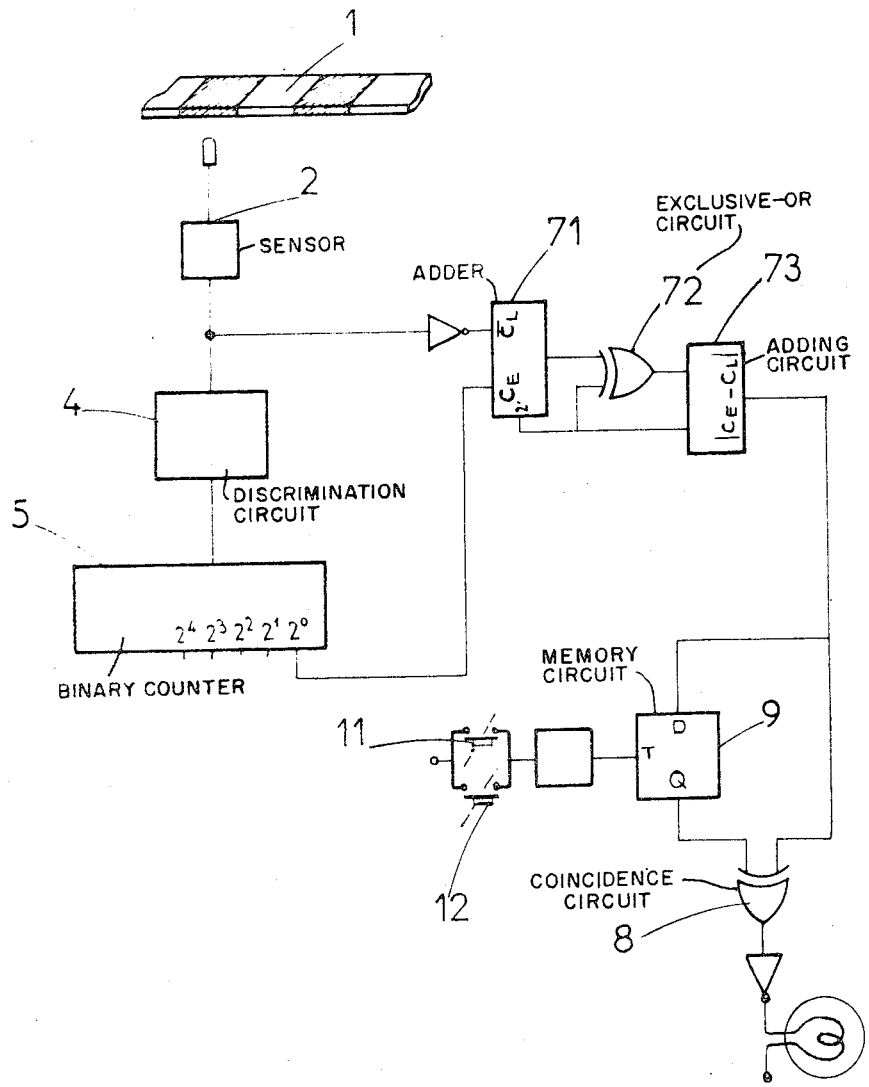
FIG. 4 is a schematic showing of detection apparatus in accordance with the invention in a displacement measuring system having one position.

In the embodiment of FIG. 1, the displacement measuring system has a graduated scale 1 and sensing apparatus 2 having four analyzers, $a$, $b$, $c$, $d$ and a circuit for revision of form of the signals emitted by these analyzers furnishing at its output a code with four positions. The signals emitted by the sensing apparatus are transformed by a transcodage matrix 3 in a one in eight code from which the signals are supplied to a circuit 4 for discrimination of the direction of displacement of the sensing apparatus which emits at one or the other of its outputs, in accordance with the direction of displacement, an impulse which is applied to the input of a binary counter 5. The bridges of this binary counter can be associated in groups of three, the three first bridges furnishing at their output the value of the least weight on the value $C_E$ registered by the counter in octal code.

It is seen that in this case the value $C_L$ is expressed in a code with four positions and the registered value $C_E$ is in an octal code. These two codes not being compatible, the sensor code is transformed by a transcodage matrix 6 transferring the value $C_L$ to an octal code.

The two values $C_E$ and $C_L$ are applied to the two inputs of a subtractor circuit 7 which furnishes at its output the absolute value of the difference $C_E - C_L$. The three bits of the difference $C_E - C_L$ expressed in octal code is applied on one hand to the input of the coincidence circuit 8 and on the other hand each to a memory circuit 9 which applies the memorized difference on the other input of the coincidence circuit. The memory circuit 9 is actuated by prepositioning buttons or by buttons returning the counter to zero. Consequently, each time the counter is returned to zero for a certain position of the sensors or the counter is prepositioned on a value, as is often done in numerically controlled machines, the circuit 9 takes into account the difference $C_E - C_L$ existing at this moment and applies it to the input of the coincident circuit. When the sensors then move, the instantaneous difference $C_E - C_L$ is then compared permanently in the coincidence circuit with the difference memorized at the instant of origin. In case of non-coincidence caused by the registry of a parasite by the counter, in counting or in uncounting, the change in logic level of the output of the coincidence circuit 8 actuates an alarm apparatus 10 which can be, for example, either a luminous indicator or a sounding device. The operator is thus automatically warned as of the moment when an error occurs. It is easy for the operator to see in which direction the error occurs and to compensate for it.

In the more complete schematic view of FIG. 2, there has been shown by way of example circuits 6, 7, 8 which can be utilized.

The sensor code with four positions can be of the following type:

| | a | b | c | d | | | $2^2$ | $2^1$ | $2^0$ |
|---|---|---|---|---|---|---|---|---|---|
| 0 : | 0 | 0 | 0 | 0 | | 0 : | 0 | 0 | 0 |
| 1 : | 1 | 0 | 0 | 0 | | 1 : | 0 | 0 | 1 |
| 2 : | 1 | 1 | 0 | 0 | | 2 : | 0 | 1 | 0 |
| 3 : | 1 | 1 | 1 | 0 | (T) | 3 : | 0 | 1 | 1 |
| 4 : | 1 | 1 | 1 | 1 | | 4 : | 1 | 0 | 0 |
| 5 : | 0 | 1 | 1 | 1 | | 5 : | 1 | 0 | 1 |
| 6 : | 0 | 0 | 1 | 1 | | 6 : | 1 | 1 | 0 |
| 7 : | 0 | 0 | 0 | 1 | | 7 : | 1 | 1 | 1 |

The transcoding circuit 6 causes the transformation T of this sensor code into an octal code in accordance with the following logic equations:

$$2^2 = d$$
$$2^1 = b\bar{d} + d\bar{b}$$
$$2^0 = a\bar{b} + c\bar{d} + \bar{a}b + \bar{c}d$$

The circuit 6 shown in broken line in FIG. 2 is an embodiment utilizing an NO-AND logic The subtracting circuit 7 can, as seen in FIG. 2, include an adder 71 forming the sum of the value $C_E$ with the complement $\bar{C}_L$ of the value $C_L$. If $C_L$ is smaller than $C_E$, that is, if the difference $C_E - C_L$ is positive, the sum $C_E + \bar{C}_L$ has a carry-over whose weight is $2^4$. This value is applied to the input of an Exclusive-OR circuit 72 which also receives the sum $C_E + \bar{C}_L$ and this is applied also to the input of an adding circuit 73 to which is branched the output of the Exclusive-OR circuit 72. Consequently, when there is a carry-over, the circuit Exclusive-OR circuit 72 passes the sum $C_E + \bar{C}_L$ to circuit 73 adding one by forming at its output the sum $C_E + \bar{C}_L + 1$ which corresponds closely to $C_E - C_L$. On the other hand, if $C_L$ is greater than $C_E$, the difference $C_E - C_L$ is negative and the sum $C_E + \bar{C}_L$ is less than eight. A carry-over is not produced and the Exclusive-OR circuit 72 inverses the sum $C_E + \overline{C_L}$ which appears without other modification at the output of circuit 73. Consequently, in all cases, circuit 7 furnishes at its output the absolute value of the difference $C_E - C_L$.

Memory circuit 9 has three bridges of type D each receiving on its input D a bit of the difference $C_E - C_L$ formed by the subtracting circuit 7. This difference is applied also to the input of coincident circuit 8 which is made up for example of an Exclusive-OR circuit 81 with three gates connected each to an output of subtractor circuit 7 and each gate connected to a part of the output Q of the corresponding bridge of circuit 9. It is known that the level of output S of an Exclusive-OR circuit is related to the level of the inputs $a$ and $b$ by the following table:

| a | b | S |
|---|---|---|
| 0 | 0 | 1 |
| 1 | 1 | 1 |
| 0 | 1 | 0 |
| 1 | 0 | 0 |

The output of the circuit thus presents a logic level 1 each time that the two inputs are at the same level, and a zero level each time that the inputs are at a different level. When the counter has been prepositioned on a determined side by actuating button 11 or has been returned to zero by actuating button 12, a rising slope is applied through adapter 13 on the input T of the three bridges 9 which passes to the output Q the level applied on input D. The inputs $a$ and $b$ of the three bridges of the Exclusive-OR circuit 81 are at the same level and, if the outputs of the three bridges are branched on a NOR gate 82, the output of this gate is at the zero logic level.

While buttons 11 and 12 remain unactuated, the level of the outputs Q of the bridges 9 do not change and the three bits of the difference $C_E - C_L$ remain memorized.

If a parasitic impulse enters in counter 5, the difference $C_E - C_L$ changes by a unit and one of the three bits coming from the output of subtractor circuit 7 changes in level. The output of the gate corresponding to the EXclusive-OR circuit thus passes to the zero level since its inputs are no longer at the same level, and produces at the output of gate 82 a logic level 1 which actuates the alarm mechanism 10. The operator can, without stopping the machine, note the direction in which the parasitic impulse has been registered to adjust for it and he can again apply the rising slope on input T of bridges 9 to memorize the new difference at input D.

FIG 2 represents the case where the displacement measuring system has a floating zero. In this case, the system is connected to a posting circuit 41 of the sign of the value of the sensors corresponding to the position chosen for zero and has a circuit 42 for determination of the direction of count, in view of the direction of displacement of the sensor and of the sign.

It is known, in effect that, when the sensor is in the positive zone of the scale and is moved toward zero, the counter should uncount the impulses but upon passage through zero, this being considered as positive, the counter should again count and indicate at this moment a value which is the complement to the base of the output code of the value which should be indicated if zero had not been passed. Such devices are known and are shown in detail in the application for patent above referred to.

The passage through zero should not change the absolute value of the difference $C_E - C_L$ memorized for a certain position of the sensor so that it is necessary that the change of sign does not reverse the direction of count of the value. Consequently, it is necessary to reestablish for the value $C_E$ a counting direction which will be constant from one end to the other of the scale. For this reason complementation apparatus is utilized to the base which will pass the value $C_E$ when this is positive but which will change this value to its complement to the base when the value is negative.

Such apparatus is seen in FIG. 2. It is composed of an Exclusive-OR circuit 51 and an adder 52. In the octal code, represented on FIG. 2, the Exclusive-OR circuit 51 has three gates each receiving one of the bits of the value $C_E$ and receiving the applied sign. The output of the Exclusive-OR circuit is branched on an input of the adding circuit 52 the other input of circuit 52 receiving the inverse of the applied sign.

From this, when the sensor is in a positive zone, the plus sign is at level 1 and this level is applied on the gates of the Exclusive-OR circuit which then passes without modification of the three bits of the value $C_E$. The second input of adding circuit 52 receiving a null level, the value $C_E$ traverses the circuit without being modified and is applied to the input of subtracting circuit 7.

This continues up to the zero value, this being considered, as has been seen, as positive.

As soon as the zero value is passed, the line of application of the sign passes to the null level and then the less sign is applied and the value of output of the counter, which should be 7, becomes one. This value is applied to the input of the Exclusive-OR circuit 51 of which the three gates receive a null level. Circuit 51 inverses all of the bits of the output side of the counter if it is negative.

However, the null level corresponds to the negative sign and is transformed by inverter 53 to a level 1 which is applied on the pole $2^0$ power of the second input of the adding circuit 52. This carries out the sum $C_E + 1$.

It is known that for all of the codes having a base equal to the power of 2, this number $\overline{C_E} + 1$ is the complement of the base of the number C4. If no account is taken of the bits of weights greater than the base, one would then obtain the value which should be the output from the counter if there has not been provided within the counter a complementation due to the change of sign.

It should be understood that this problem does not exist in circuits not including change of sign such as that of FIG. 1.

FIG. 3 shows an arrangement for detection of errors in a measuring system utilizing a decimal counter. In this case, a sensor is used with five analyzers, $a, b, c, d, e$, giving a code with five digits. This sensor code is transformed by the transcoder 3 into a one in 10 code and the discrimination circuit 4 for the direction of movement emits an impulse for each displacement of the apparatus through an increment equal to one-tenth of step $p$ of the scale.

As in the case of FIG. 2, the system includes a circuit 42 for determination of the direction of count in view of the direction of displacement and of the sign applied by circuit 41 and sensing the impulses to the counter either in the counting direction or in the uncounting direction. Counter 5 is composed of a set of decoders each comprising four bridges each connected to an indicator 54 having ten positions actuated by an adaptor 55 causing correspondence between each value coded in DCB at the output of a decoder and a corresponding decimal value.

Transcoding circuit 6 is branched on the five outputs of the sensor and causes a DCB code to correspond to a code with five digits. By way of example, circuit 6 is shown utilizing a NO-AND logic.

There is thus obtained the value $C_L$ corresponding to the position of the sensor within a scale graduation and expressed at the output of circuit 6 in DCB code. This code corresponds closely to that of the output of the decade of the weakest range of counter 5. It is thus possible to compare the two values $C_E$ and $C_L$ in DCB.

In the case where the system does not have a floating zero, the four outputs of the decade of the weakest range of the counter would be connected directly to subtractor circuit 7.

This would comprise, as in the case of the octal code represented in FIG. 2, and adding circuit 71, an Exclusive-OR circuit 72 and another adding circuit 73 creating the sum of the values appearing at the output of the Exclusive-OR circuit with the final remainder.

It is to be understood that the Exclusive-OR circuit 72 has four bridges in the case of a code with five positions. The same is true for the memory circuit 9 and the Exclusive-OR circuit 81.

In the usual case in which the system has a floating zero, a complementation circuit is utilized for the base analogous to that which has already been described in the case of FIG. 2. It comprises, in effect, an Exclusive-OR circuit 51 passing the value $C_E$ when it is positive. On the other hand, when the sensor passes zero to enter into the negative zone, the logic level 1 which causes the application of the negative sign is applied to the inputs of the Exclusive-OR circuit 51 in such a way that it inverses the four bits emitted at the output of the decade of the lowest weight of the counter and it is applied on one hand to the input $C_N$ of adding circuit 52 and on the other hand on the poles 21 and 23 of the second input of adding circuit 52, poles $2^0$ and $2^2$ being connected to ground.

It follows, when value $C_E$ is positive, it passes in the circuits 51 and 52 without being modified and is applied to the input of subtracting circuit 7. On the other hand when the value $C_E$ is negative, circuit 52 produces the sum $10 + \overline{C_E} + 1$. It is known that $\overline{C_E}$ being the number having its bits inversed from those of $C_E$, $10 + \overline{C_E} + 1$ is the complement by 10 of $C_E$. The value has thus been re-established which in the output of the decade of the lowest weight if there had not been a change of sign.

The preceding examples show that the error detection apparatus as described can be applied to all displacement measuring systems whatever the code utilized. It should be understood that the apparatus will be very simplified if a code with one or two positions is used.

FIG. 4 shows an embodiment used for a code with one position. Such a system could, for example, be utilized to count the number of turns of a rotating disc rotating in the same direction. In this case the sensor is a single analyzer and there is no direction discrimination circuit, the impulses being generated by differentiation. The impulses are totalled in binary counter having its output $2^0$ connected to an adding circuit 71 having its other input connected through an invertor to the output of the sensor.

Circuit 71 provides at its output the number $C_E + \overline{C_L}$ and, as in the preceding embodiments, the Exclusive-OR circuit 72, which has only one gate, inverses this sum in the case where there is no remainder and passes it unmodified in the case of a remainder, the adding circuit 73 providing the sum $C_E + \overline{C_L} + 1$ which corresponds to $C_E - C_L$ when $C_E$ is greater than $C_L$. There is thus, as in the preceding embodiments, always at the output the absolute value of $C_E - C_L$.

The remainder of the apparatus is simplified in the same way, memory circuit 9 having a single bridge and coincidence circuit 8 a single Exclusive-OR gate connected by an inversor to alarm mechanism 10.

This error detecting apparatus provides control of parity assuring detection of parasites which could be registered in the counter and would then change the parity of the number from the output of the counter.

In the case where the sensor has two analyzers giving a code with two positions, the control code would still be compatible with the output code of the counter without the necessity of utilizing a transcodage device. Consequently, as in FIG. 4, the adding circuit 71 would be connected directly with one of two outputs of the sensor and to the outputs $2^0$ and $2^1$ of the counter.

The remainder of the circuits would be little modified, the Exclusive-OR circuits 8 and 72 having two gates and the memory circuit 9 having two type D bridges.

This arrangement of the sensor with two analyzers could be utilized in a simple counting system. The detection device would verify the position of the sensor within a graduation of the scale and take into account the occurrence of parasites.

The impulse generation circuit would be analogous to that of FIGS. 1 and 2 utilizing a transcodage network for a code with two positions in a one in four code.

In the case where the scale has a floating zero, a complementation circuit would be used with a base analogous to that shown in FIG. 2 which, as has there been seen, is applicable to all the systems utilizing a code in which the base is equal to a power of two.

FIG. 5 shows an embodiment of the adaptor circuit 13 which actuates the bridges of memory circuit 9. Circuit 13 comprises two monostables 131, 132 having constants $\Theta_1$–$\Theta_2$, which suppress the reboundings of the contacts of push-buttons 11 and 12 and give a clearing signal having a constant level and applying on the slope of descent of this signal the impulse provided by memory 9 of the difference $C_E - C_L$ appearing at this moment at the output of subtractor circuit 7. It is actuated by the commutators 11 and 12 branched at the input of the counters and providing a choice of zero position, the other applying to the counter a value which is taken as base.

It should be understood that the invention is not limited to the details of the several embodiments which have been described above and which could be modified without departing from the present inventive concept.

Several examples have been given with respect to the different codes usually used but the present invention for detection of errors could be adapted to any code utilized in a system for measurement of displacement.

The present detection apparatus can be applied to all systems for the measurement of displacement whatever the method of generation of impulses and the type of counter used.

Further, FIGS. 2 and 3 show logic schemes of the transcodage circuits there utilized but these could obviously be easily modified. In the same way, FIG. 3 represents an example of the Exclusive-OR circuit 51 utilizing NO-AND gates but obviously all types of Exclusive-OR circuits could be used. FIGS. 2 and 3 give simple examples of complementation circuits to the base of the registered value. Other types of circuits could be used in which it would not be necessary to give an arbitrarily positive sign to zero.

In the examples, the alarm device has been shown schematically as a luminous indicator but it would be obvious to utilize any other indicators such as a sounder.

What I claim is:

1. Apparatus for the automatic detection of counting errors in a displacement measurement system by encoding and counting comprising a measuring scale, sensor means including $n$ analyzers each emitting on displacement before said scale a sensing signal, a generation network providing from the sensing signals counting impulses each corresponding to a displacement of an increment, a determination circuit connected to said generation network for determining the direction of count, a counter of said impulses, a plurality of output terminals for said counter furnishing in binary code the value $C_E$ registered by said counter, each of said terminals corresponding to a bit, the combination of said sensing signals furnishing the value $C_L$ from the sensor means in a sensing code having $n$ positions to distinguish $2n$ increments within a graduation of said scale, a subtractor circuit for subtracting said value $C_L$ from the value $C_E$, a memory circuit for the difference $C_E - C_L$ at a time chosen as origin of the sensing, a coincident circuit receiving the instantaneous difference $C_E - C_L$ and the memorized difference and alarm means actuated by said coincident circuit upon non-coincidence of these differences.

2. Apparatus for the detection of errors as described in claim 1, the registered value $C_E$ from which is subtracted the value $C_L$ being the signal formed on the $p$ first outputs of said counter, $p$ being a unity such that $2p - 1$ is greater than or equal to $n$.

3. Apparatus for the detection of errors as described in claim 1, said counter providing a sensing code and an output code, the sensing code and the output code of said counter being compatible and the registered value $C_E$ and the value $C_L$ being directly applied to the inputs of said subtractor circuit.

4. Apparatus for the detection of errors as described in claim 1, said counter providing a sensing code, the sensing code and the value at the output of said counter not being compatible, the registered value $C_E$ and the value $C_L$ being applied to the inputs of said counter, one directly and the other through a circuit changing said value into an identical code with that of the other value.

5. Apparatus for the detection of errors as described in claim 1, the system having a floating zero and including a circuit for determination of the sign of the registered value, the registered value $C_E$ being applied to the input of said subtractor circuit through a complementation circuit including an exclusive-OR circuit and an adder of said value $C_E$ to the base of the output code of said counter, said circuit being actuated by a change of sign.

6. Apparatus for the detection of errors as described in claim 5, said complementation circuit for $C_E$ including an Exclusive-OR circuit with $p$ gates each receiving one of the bits of $C_E$ and receiving the sign signal and an adding circuit, an input of said adding circuit being connected to the outputs of said Exclusive-OR circuit and another input receiving the base of the sensing code, said input being supplied with the inverse of the sign signal.

7. Apparatus for the detection of errors according to claim 1, said subtractor circuit including a first adding circuit adding the values $C_E$ and $C_L$ expressed in compatible codes, outputs for said circuit connected each to a gate of an Exclusive-OR circuit and further connected on the output of said first adding circuit and a second adding circuit for the signal emitted at the output of said Exclusive-OR circuit with the signal from said first adder.

8. Apparatus for the detection of errors as described in claim 1, said memory circuit including a plurality of type D bridges each connected to one of the outputs of said subtracting circuit and of which the input T is controlled either by prepositioning or by a return to zero of said counter.

9. Apparatus for the detection of errors as described in claim 1, said coincident circuit including an Exclusive-OR circuit, gates for said circuit each connected to one of the outputs of said subtractor circuit and to the corresponding output of said memory circuit and a NOR gate connected to the outputs of said Exclusive-OR circuit, the output of said Exclusive-OR circuit actuating alarm means.

* * * * *